(No Model.) 2 Sheets—Sheet 1.
S. P. McKELVEY & G. L. VAN BEEK.
REVERSIBLE SEAT.
No. 363,661. Patented May 24, 1887.
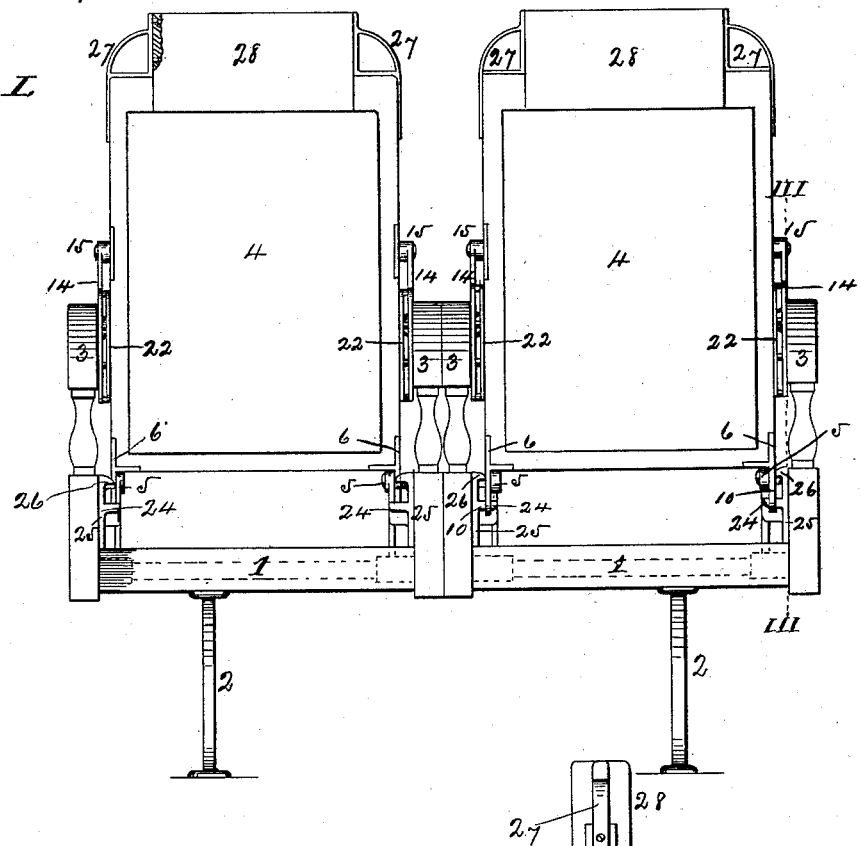
Fig. I
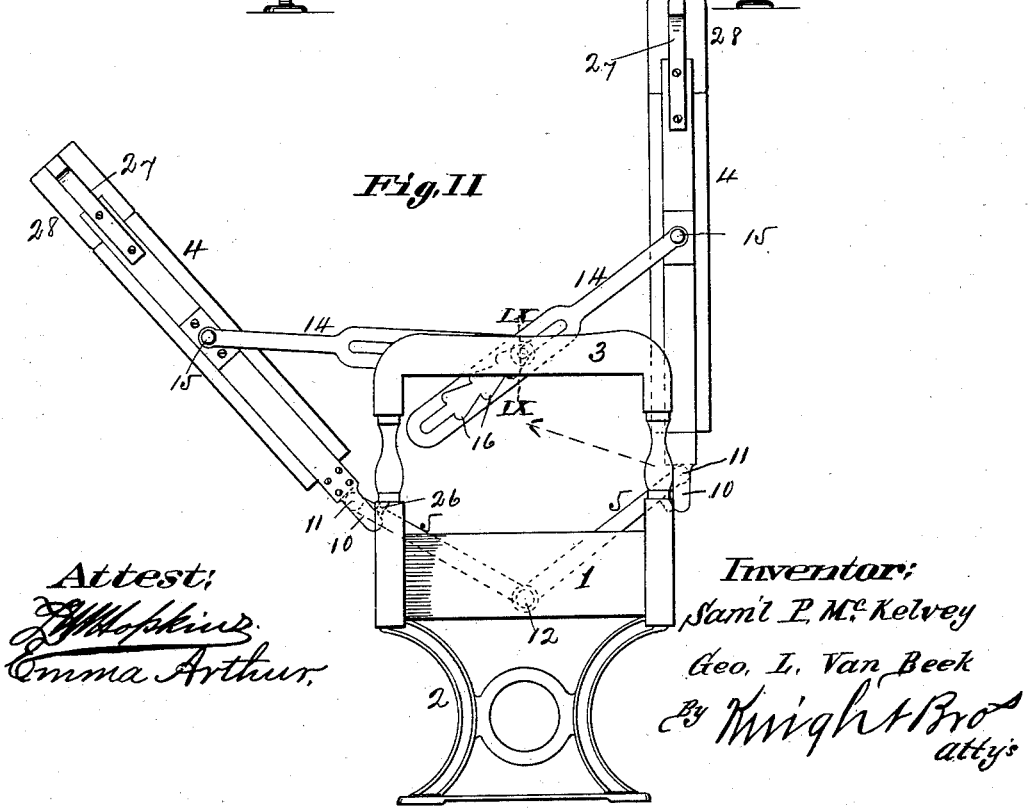
Fig. II
Attest:
T. W. Hopkins
Emma Arthur
Inventor:
Sam'l P. McKelvey
Geo. L. Van Beek
By Knight Bros
att'ys (No Model.) 2 Sheets—Sheet 2.

S. P. McKELVEY & G. L. VAN BEEK.
REVERSIBLE SEAT.

No. 363,661. Patented May 24, 1887.

Fig. III.
Fig. V.
Fig. IV.
Fig. VII.
Fig. VI.
Fig. VIII.
Fig. IX.

Attest:
W. H. Hopkins
Emma Arthur

Inventors:
Sam'l P. McKelvey,
Geo. L. Van Beek,
By Knight Bros
att'ys.

N. PETERS, Photo-Lithographer, Washington, D. C.

UNITED STATES PATENT OFFICE.

SAMUEL P. McKELVEY AND GEORGE L. VAN BEEK, OF ST. LOUIS, MISSOURI, ASSIGNORS TO THE ST. LOUIS CAR-SEAT COMPANY.

REVERSIBLE SEAT.

SPECIFICATION forming part of Letters Patent No. 363,661, dated May 24, 1887.

Application filed February 7, 1887. Serial No. 226,748. (No model.)

*To all whom it may concern:*

Be it known that we, SAMUEL P. McKELVEY and GEORGE L. VAN BEEK, both of the city of St. Louis, in the State of Missouri, have invented certain new and useful Improvements in Reversible Seats, of which the following is a full, clear, and exact description, reference being had to the accompanying drawings, forming part of this specification, in which—.

Figure I is a front elevation of our improved seat. Fig. II is a side elevation, showing one back on each side of the seat, and one of them in a vertical position and the other in an inclined position. Fig. III is a vertical section through the seat, taken on line III III, Fig. I, the backs being shown in the same position as in Fig. II. Fig. IV is an enlarged perspective view of the rock-shaft and arms of the back. Fig. V is an enlarged perspective view of one of the bracket-plates that form the stops for the backs. Fig. VI is an enlarged perspective view of one of the brackets forming a connection between the outer ends of the lower arms and the lower ends of the backs. Fig. VII is an enlarged perspective view of one of the upper arms, showing the ratchet thereon, and the plate for covering the ratchet. Fig. VIII is an enlarged perspective view of one of the buttons for securing the upper arms to the arm-rests of the seat. Fig. IX is an enlarged transverse section through one of the arm-rests, one of the upper arms, and button, this section being taken on line IX IX, Fig. II.

Our invention relates to reversible seats intended more particularly for use in railway-cars, but which may be used for other purposes; and our invention consists in features of novelty hereinafter fully described, and pointed out in the claims.

Referring to the drawings, 1 represents the frame or body of the seat and 2 the supporting-legs. 3 represents the arm-rests and 4 the backs. The lower ends of the backs are connected to the frame of the seat by means of arms 5, the outer ends of the arms being pivoted to brackets 6, (see Figs. II, III, and VII,) each bracket consisting of portions 8, (see Fig. VII,) which are perforated to receive screws 9, by which they are secured to the lower corners of the backs, and portions 10, to which the outer ends of the arms 5 are pivoted at 11, the portions 10 of the brackets extending below the pivot-points 11. The inner ends of the arms 5 are secured to a rock-shaft, 12, journaled in boxes 13, by which it is secured to the frame of the seat, as shown in Figs. III and IV and by dotted lines in Fig. I. The arms are rigidly secured to this shaft, so that the latter is made to turn as the seat is reversed, and there being a rigid connection between the two parts, the outer ends of the arms are held from the slightest lateral movement or play, so that the movement of the back, in reversing it, is easy and not liable to be twisted, which would interfere with its easy movement, this having been found in practice an advantage in this way.

14 represents upper arms that connect the backs about midway of their length to the arm-rests, the outer ends of the arms 14 being pivoted at 15 to the backs and the inner ends of the arms being formed with upper and lower ratchet-teeth, 16, which engage with a pin, 17, in the arm-rests of the seat. The pin 17 is secured to the arm-rests by a screw, 18, and has an inner flange, 19, and an outer flange, 20, forming a groove, 21, (see Fig. IX,) in which the arms 14 fit. The central portion of the pin between the flanges receives the ratchet-teeth of the arm, and the ratchet being double, as shown in Figs. III and VII—that is, with teeth on both the lower and upper faces the pin is made to engage with one set of teeth when the back is in one position, and when it is in the other position engage with the other set of teeth.

To avoid danger of passengers getting their fingers caught in the ratchet-teeth, we secure a plate, 22, to the inside of the inner ends of the arms 14, as shown in Fig. VII, thus covering the teeth.

In reversing the backs, they are brought into the position shown on the right-hand side of Fig. II, and then the lower ends are swung on the line indicated by the dotted arrow, Fig. II, and the seat is thus reversed, the arms 5 and the rock-shaft 12 holding the backs firm and preventing their twisting as they are thus reversed.

When the backs are in position for use, the arms 5 rest upon brackets 24 of plates 25, secured to the frame of the seat, as shown in Figs. I, II, and III.

When the backs are inclined to their greatest extent, as shown on the left-hand side of Fig. II, there is a liability of the lower ends of the backs moving upward and the outer ends of the backs moving downward, so that the passengers are in some danger of being thrown backward out of the seat. To avoid any difficulty of this kind, we form brackets 26 on the plates 25, under which the extensions 10 of the brackets 6 project, as shown on the left-hand side of Fig. II, thus preventing any danger of the lower ends of the backs moving upward, as stated. These brackets 26 do not, however, project sufficiently to interfere with the passage of arms 5.

As the backs are made to assume a vertical position from that shown on the left-hand side of Fig. II, the projections 10 are moved out of line with the brackets 26, so as not to interfere with the reversing of the back or moving the back to the other side of the seat.

To afford an easy means of taking hold of the backs to reverse them, we form upon their upper corners hand-holds 27, formed by brackets that are secured to the body of the backs, as shown in Fig. I. These hand-holds are preferably formed of castings, which, being polished, would not disfigure but add to the appearance of the seats. Between the hand-holds 27 may fit a head-rest, 28. This is preferably narrower than the back 4, and the hand-holds 27 are formed with angular portion fitting the head-rest and back, and fixed thereto, and with rounded portion spanning the angle and of form to be easily grasped.

We claim as our invention—

1. In a reversible seat, in combination with the frame or body, lower arms pivoted to the frame at their inner ends, brackets 6, formed, as shown and described, for securing the outer ends of the arms to the lower ends of the backs, bracket-plates 25, secured to the frame of the seat and having projections 26, under which extensions 10 of the plates 6 extend when the backs are inclined, and upper arms connecting the backs to the arm-rests of the seat, substantially as and for the purpose set forth.

2. In a reversible seat, the combination of the frame, arms 5, pivoted to the frame at their inner ends, brackets 6, having extensions 10, and by which the outer ends of the arms are secured to the backs, plates 25, having brackets 24 and projections 26, and upper arms connecting the backs to the arm-rests of the seat, substantially as and for the purpose set forth.

3. In a reversible seat, the combination of the body, back, and head-rest narrower than the back, the hand-holds having angular portion fixed to the back and head-rest, and curved portion spanning the angle, substantially as and for the purpose set forth.

SAMUEL P. McKELVEY.
   GEORGE L. VAN BEEK.

In presence of—
 GEO. H. KNIGHT,
 EDW. S. KNIGHT.